United States Patent [19]

McClure

[11] Patent Number: 4,670,800
[45] Date of Patent: Jun. 2, 1987

[54] EDGE GUIDED MAGNETIC TAPE TRACKING

[75] Inventor: Richard J. McClure, San Diego, Calif.

[73] Assignee: Eastman Kodak Company, Rochester, N.Y.

[21] Appl. No.: 730,138

[22] Filed: May 3, 1985

[51] Int. Cl.⁴ .............................................. G11B 5/56
[52] U.S. Cl. ..................................................... 360/77
[58] Field of Search ................................. 360/77, 121

[56] References Cited

U.S. PATENT DOCUMENTS

| | | | |
|---|---|---|---|
| 3,340,538 | 9/1967 | Oliver | 346/74 |
| 3,474,432 | 10/1969 | Sevilla | 340/174.1 |
| 3,526,726 | 9/1970 | Corbett et al. | 179/100.2 |
| 3,918,091 | 11/1975 | Walraven et al. | 360/77 |
| 4,048,658 | 9/1977 | Nakagawa | 360/9 |
| 4,058,841 | 11/1977 | Kishi et al. | 360/27 |
| 4,152,734 | 5/1979 | Louth | 360/70 |
| 4,163,994 | 8/1979 | Sakamoto et al. | 360/70 |
| 4,164,764 | 8/1979 | Joannou | 360/77 |
| 4,164,781 | 8/1979 | Brown | 360/77 |
| 4,179,720 | 12/1979 | Miura | 360/113 |
| 4,313,140 | 1/1982 | Keidl | 360/77 |
| 4,321,634 | 3/1982 | Lehureau | 360/70 |
| 4,346,413 | 8/1982 | Hack | 360/77 |
| 4,347,534 | 8/1982 | Kimura | 360/77 |
| 4,392,163 | 7/1983 | Rijckaert | 360/76 |
| 4,438,465 | 3/1984 | Moriya et al. | 360/22 |

OTHER PUBLICATIONS

Patents Abstracts of Japan, vol. 7, No. 198.
Patents Abstracts of Japan, vol. 1, No. 50.
Patents Abstracts of Japan, vol. 7, No. 188.
IBM Technical Disclosure Bulletin, vol. 9, No. 11.

Primary Examiner—George G. Stellar
Attorney, Agent, or Firm—Robert F. Cody

[57] ABSTRACT

Drawing on the observation that a signal which is magnetically recorded near the edge of a magnetic tape not only projects a magnetic field that is above (and below) the plane of the tape, but also projects a field that extends away from the edge thereof, the invention calls for (tracking-) control of relative head-to-tape positioning in response to the edge-projected field of a prerecorded edge-positioned tracking control signal, whereby the tightness of such control is governed directly by the spacing loss equation.

13 Claims, 3 Drawing Figures

EDGE GUIDED MAGNETIC TAPE TRACKING

BACKGROUND OF THE INVENTION

1. Field of the Invention

This invention relates in general to magnetic recording and more particularly to improved apparatus for providing tracking control during the playback of recorded signal information.

2. Description Relative to the Prior Art

There is a trend toward the packing of greater and greater amounts of data on magnetic tape. Implicit in such trend is the requirement that data tracks on such tape be as narrow, and as closely packed together, as possible. With a high-track-density multitrack magnetic head, say of a type that provides 400 tracks per inch, the tracks would be 0.0020″, given guardbands of 0.0005″. It is clearly of concern, therefore, that during playback of recorded information, the information so recovered be from the correct track, and not from a neighboring one.

It is known in the art to record tracking control signals on a magnetic tape as a vehicle for preventing head-to-tape wander during playback of information recorded on the tape. Representative prior art in this connection may be found in U.S. Pat. No. 3,474,432 which depicts the use of various prerecorded frequencies in respective tracks, the signals being mixed in such a way as to cause head position error signals to be generated in response to head-to-tape wander. Similarly, more recently issued U.S. Pat. No. 4,258,398 calls for the use of paired pre-recorded tracks as signal-sources for head orienting/positioning in connection with a multitrack configuration. Other and varied tracking control techniques have been demonstrated and taught in the art, albeit that such techniques exhibit less than optimally tight-control and, accordingly, are wanting when it comes to the matter of sensitivity.

SUMMARY OF THE INVENTION

Drawing on the observation that a signal which is magnetically recorded near the edge of a magnetic tape not only projects a magnetic field that is above (and below) the plane of the tape, but also projects a field that extends away from the edge thereof, the invention calls for (tracking-) control of relative head-to-tape positioning in response to the edge-projected field of a pre-recorded edge-positioned tracking control signal, whereby the tightness of such control is governed directly by the spacing loss equation, viz.

$$\text{playback signal loss in db} = kd/\lambda,$$

where d represents head-to-tape spacing, k is a constant, and $\lambda$ represents the recorded wavelength. Attendantly, the tightness of the tracking-control can be easily set, as desired, by appropriate selection of the wavelength of the recorded tracking control signal. For extremely tight control, the recorded wavelength is small; for looser control, the recorded wavelength is, appropriately, larger.

The invention will now be described with reference to the figures wherein

Figure 1:
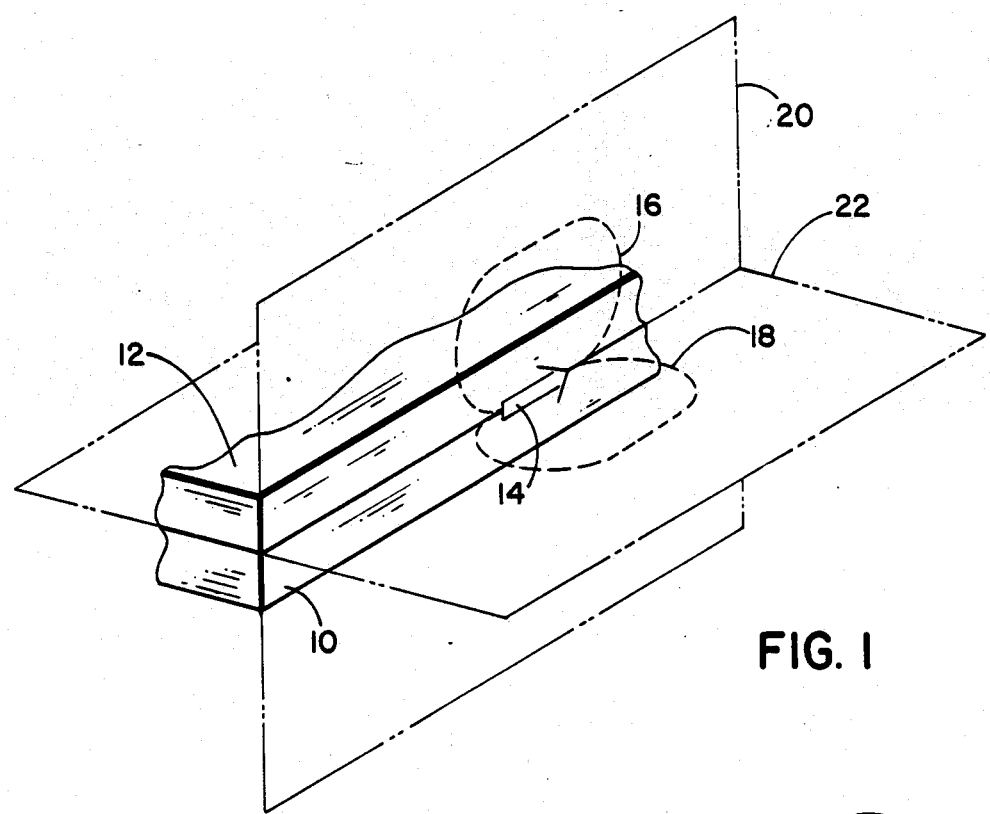
FIG. 1 is a diagram useful in describing the invention.

Referring to FIG. 1, an edge 10 of a magnetic recording tape 12 is depicted as having a representative "recorded" element situated at the tape edge 10. Looking at an end view of such an element 14, as it might reside in free space, the field associated therewith would extend outwardly from the particle 14 for 360° about the longitudinal axis of such particle. For ease of understanding the invention, however, only field components 16, 18 existing respectively in two mutually perpendicular intersecting planes 20, 22 are depicted. To read flux associated with the field component 16, a gapped magnetic head is typically positioned (as in conventional playback of recorded signals) so that the widthwise dimension of the gap thereof is perpendicular to the plane 20 and parallel to the plane 22; by contrast, to read flux associated with the field component 18, a gapped magnetic head is positioned so that the widthwise dimension of the gap thereof is perpendicular to the plane 22 and parallel to the plane 20. To date, it is believed that no use has ever been made of that part of a recorded field which emanates (plane 22) from the edge of a pre-recorded magnetic tape, let alone to provide thereby an extremely sensitive "spacing-loss" tracking control for relative head-to-tape positioning.

Figure 2:
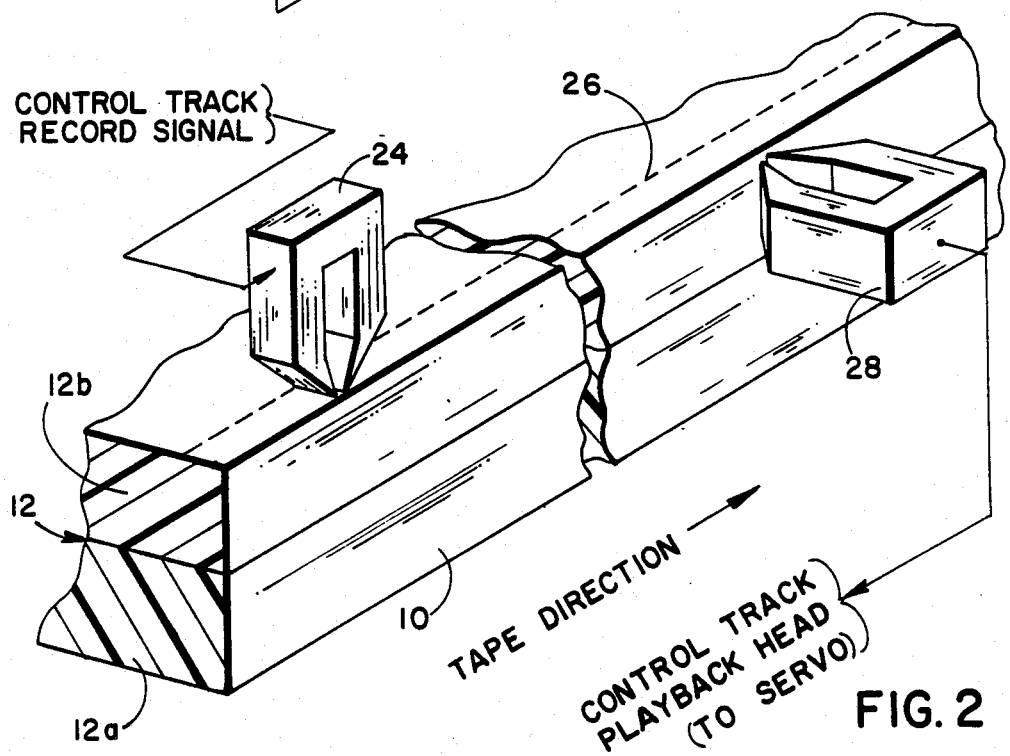
FIG. 2 is a perspective drawing of apparatus embodying the invention.

Referring to FIG. 2, a magnetic tape 12 is comprised of a non-magnetic support 12a having a magnetic coating 12b thereon. A magnetic head 24 (which is complementary to main record/reproduce head apparatus, not shown) is disposed near the edge 10 of the tape 12 and serves to record a tracking control signal of a suitable wavelength (as will be discussed below) in the plane of the tape, but at the edge 10. With the tape 12 moving in the indicated direction, a control track 26 is produced. Whereas the prior art practice of reading prerecorded control track signals is by means of a playback head disposed to read flux patterns appearing on the planar surface of the tape 12, the invention calls for a tracking control head 28 disposed to read control track signal flux which emanates from the edge 10 of such tape. Signals produced by the tracking control head 28 are applied to a servo (not shown) for adjusting the relative head-to-tape positioning of the aforesaid complementary main record/reproduce head apparatus, thereby to effect the requisite tracking. Typically, the signal produced by the head 28 is compared with a reference signal to operate such servo.

Given that the small widths and close packing of a large number of information tracks recorded on a tape militates for extremely tight control of relative head-to-tape positioning, the invention utilizes with great effectiveness the logarithmic nature of signal fall-off as a function of head-to-edge spacing. As indicated by the aforenoted spacing loss equation, the rate of fall-off of the tracking control signal (hence, the tightness of servo control) is wavelength-dependent. Thus, by appropriate selection of the wavelength of the signals which are recorded in the track 26, the sensitivity (responsiveness) of the tracking control may be set to any desired level. If extremely tight control is desired (as in the case where a large number of closely spaced information tracks must be read), the head 28 is moved very close to the edge 10 of the tape 12; and the wavelength of the recorded tracking control signal is kept, intentionally, very small (but not smaller than the length of the gap of the head 28). By contrast, if looser tracking control can be tolerated, the head 28 may be backed off a bit from the tape edge 10; and the wavelength of the recorded tracking control signal may be, accordingly, larger.

Figure 3:
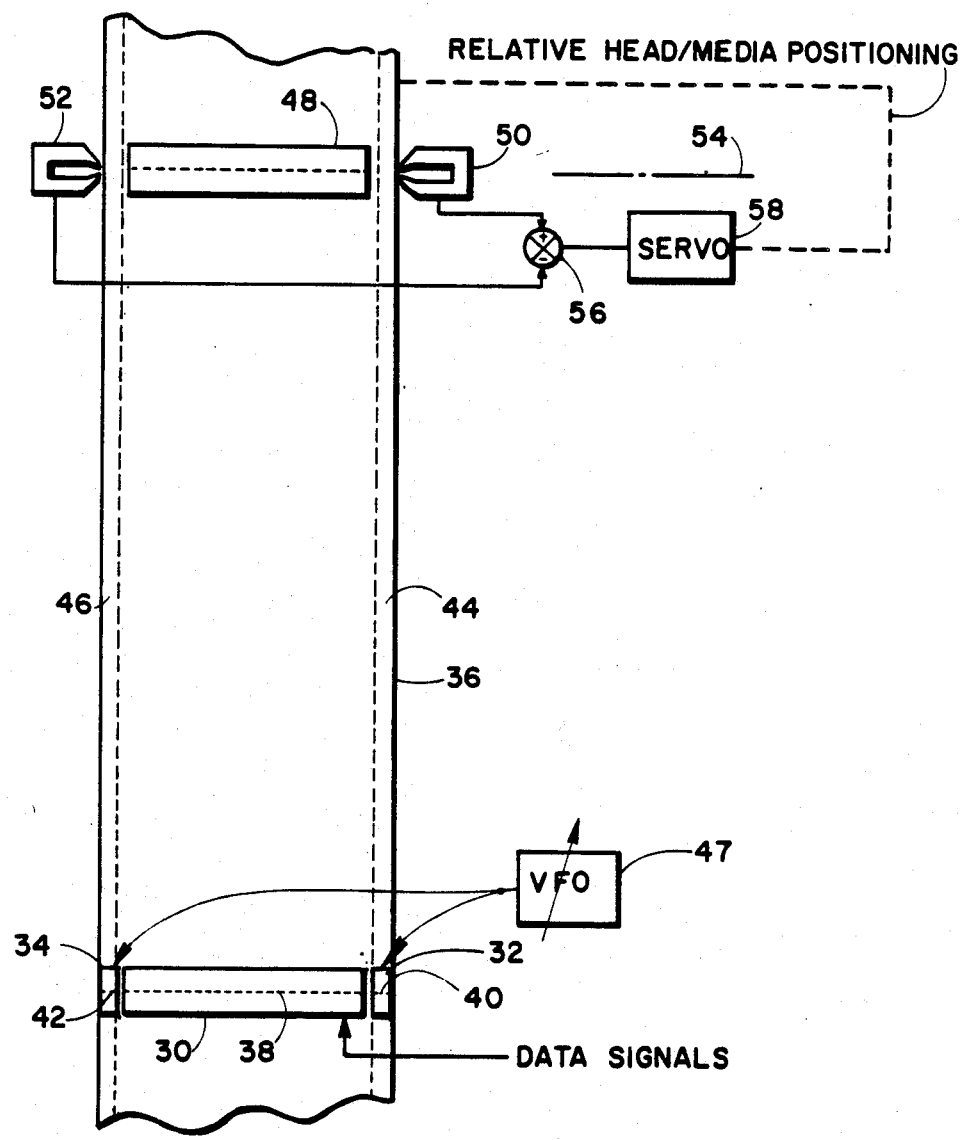
FIG. 3 is a plan view schematically illustrating a presently preferred embodiment of the invention.

Reference should now be had to FIG. 3 which shows a presently preferred implementation of the invention: A multitrack record head 30 cooperates with a pair of outbound single track record heads 32, 34 to record information and control track signals in a plurality of tracks on magnetic tape 36. In practice, the heads 32, 34 may comprise outbound cores of the record head 30; and, while the record gaps 40, 42 of the heads 32, 34 are indicated as being coextensive with the gap line 38 of the multitrack head 30, this is not a requirement of the invention. Ideally, however, the record gaps 40, 42 of the heads 32, 34 respectively should be coextensive with each other, thereby to assure that the phases of the tracking control signals in the tracks 44, 46 are the same. Data, or information, signals are applied to the cores of the multitrack head 30 by suitable means (not shown); and, tracking control signals, of appropriate wavelength, are applied to the heads 32, 34 by means of a variable frequency oscillator 47, thereby to produce control tracks 44, 46.

A multitrack playback head 48, adapted to read the information tracks recorded by the head 30, is disposed for positioning between the control tracks 44, 46. Positioned to sense flux emanating from the opposing edges of the tape 36 are paired single track playback heads 50, 52, such heads having the respective crosswise dimensions of their gaps perpendicular to the plane of the tape 36. The gaps of the heads 48, 50, 52 are all, ideally, aligned with each other along a line 54, thereby to assure that tracking control signal flux sensed by the gaps of the heads 50, 52 is most relevant to track control positioning at the gap line of the playback head 48. The gaps of the heads 50, 52 have lengths which are less than the wavelengths of the signals recorded in the control tracks 44, 46.

Output signals produced by the heads 50, 52 are applied to a differencing device 56 to produce an error signal for driving a servo 58 adapted to provide relative positioning between the multitrack head 48 and the tape 36. Needless to say, the head 48 may be positioned with respect to the tape 36, or the tape 36 may be positioned with respect to the head 48. Various techniques for providing such positioning are known to those in the art.

As the tape 36 drifts closer to one or the other of the heads 50, 52, a signal of appropriate polarity is "logarithmically" generated by the circuit 56 to cause the servo 58 to restore, immediately, the tape to a reference position, whereby the head 48 reproduces such signals as are recorded in corresponding tracks by the head 38. For example, should the tape drift closer to the head 50 and away from the head 52, the signal from the head 50 increases logarithmically, and the signal from the head 52 decreases logarithmically. Attendantly, the error signal output of the differencing circuit 56 causes the servo 58 to provide, quickly, the requisite relative head-to-tape positioning to cancel the servo input error signal. When the relative head-to-tape positioning is as indicated in FIG. 3, the output signals from the heads 50, 52 are equal, resulting in a zero error signal to the servo 58.

The invention has been described in detail with particular reference to a presently preferred embodiment, but it will be understood that variations and modifications can be effected within the spirit and scope of the invention.

What is claimed is:

1. Magnetic recording apparatus of the type adapted to transport a magnetic tape in a direction that is longitudinal of said tape, comprising
    a. means for recording a control signal upon the recording face of said tape, said recording being proximate the edge of said tape,
    b. a tracking control magnetic head disposed proximate the edge of said tape and so disposed as to sense recorded flux thereof that extends away from the edge of said tape in the plane of said tape, and
    c. means responsive to the output signal of said head for varying the relative position between said head and said tape.

2. The apparatus of claim 1 wherein said tracking control magnetic head is a magnetic head having a transducer gap, the length of said gap being in the direction of the longitudinal axis of said tape, and the widthwise dimension of said gap being perpendicular to the plane of said tape.

3. The apparatus of claim 1 further comprising a playback magnetic head disposed to play back information signals recorded in the plane of said tape, said playback magnetic head being disposed longitudinally of said tape in proximity to said tracking control magnetic head.

4. The apparatus of claim 3 wherein
    a. said tracking control magnetic head is a magnetic head having a transducer gap, the length of said gap being in the direction of the longitudinal axis of said tape, and the widthwise dimension of said gap being perpendicular to the plane of said tape,
    b. said playback magnetic head is a gapped magnetic head, and
    c. the gaps of said playback and tracking control magnetic heads are in substantial alignment.

5. The apparatus of claim 1 further comprising a second tracking control head disposed at the opposite edge of said tape for sensing recorded flux thereof that extends away from said opposite tape edge in the plane of said tape.

6. The apparatus of claim 5 further comprising means for algebraically combining the signal outputs of said two tracking control magnetic heads for varying the relative position of said tape with respect to both said tracking control heads.

7. The apparatus of claim 6 further comprising a gapped playback magnetic head disposed to play back signals recorded in the plane of said tape, and wherein said two tracking control heads are gapped heads, the gaps of all said heads being in substantial alignment.

8. In cooperation with and forming part of magnetic tape recording apparatus,
    a. means for recording on the surface of said magnetic tape along its longitudinal length, and at one of the edges thereof, a pre-recorded tracking signal, and
    b. a gapped magnetic head the gap of which is such that the gap length is in the direction of the longitudinal axis of said tape as said tape is transported by said apparatus, the widthwise dimension of said gap, however, being perpendicular to the plane of the tape so as to sense signal producing flux emanating from the edge and in the plane of said tape, the signal produced by said head being a tracking error signal.

9. Magnetic recording and playback apparatus comprising a. a record head for recording data signals on the surface of and along the length of magnetic tape,
b. control track recording means for recording a tracking control signal on the surface of and along the length of said tape proximate the edge of said tape,
c. a gapped playback head cooperating with the surface of said tape for reproducing the data signals recorded by said record head,
d. a gapped tracking control magnetic head so disposed in proximity to said playback head that said tracking control magnetic head senses, and produces a tracking control signal that corresponds to, the flux associated with said recorded tracking control signal which emanates from the edge of said tape substantially in the plane of said tape, and
e. means responsive to said tracking control signal for adjusting the relative position between said tape and said playback head.

10. The apparatus of claim 9 wherein the gaps of said playback and tracking control magnetic heads are substantially in alignment.

11. The apparatus of claim 9 further comprising means for preselecting the frequency of the signal applied to said control track recording means.

12. The apparatus of claim 9 further comprising
a. a second control track recording means for recording a second tracking control signal along the length of said tape proximate the other edge of said tape,
b. a second gapped tracking control magnetic head so disposed in proximity to said playback head that said second tracking control magnetic head senses, and produces a tracking control signal that corresponds to, the flux associated with said second tracking control signal which emanates from said other edge of said tape in the plane of said tape, and
c. means for
  1. algebraically combining the signals of said two tracking control magnetic heads cooperative with said means for adjusting the relative position of said tape and said playback head and
  2. for operating said means for adjusting in correspondence with said algebraically combined signals.

13. The apparatus of claim 12 wherein the gaps of said playback and tracking control magnetic heads are substantially in alignment.

* * * * *